Nov. 15, 1927.  1,648,917
O. D. SCHVARTZ
STEERING DEVICE
Filed June 13, 1924   2 Sheets-Sheet 1
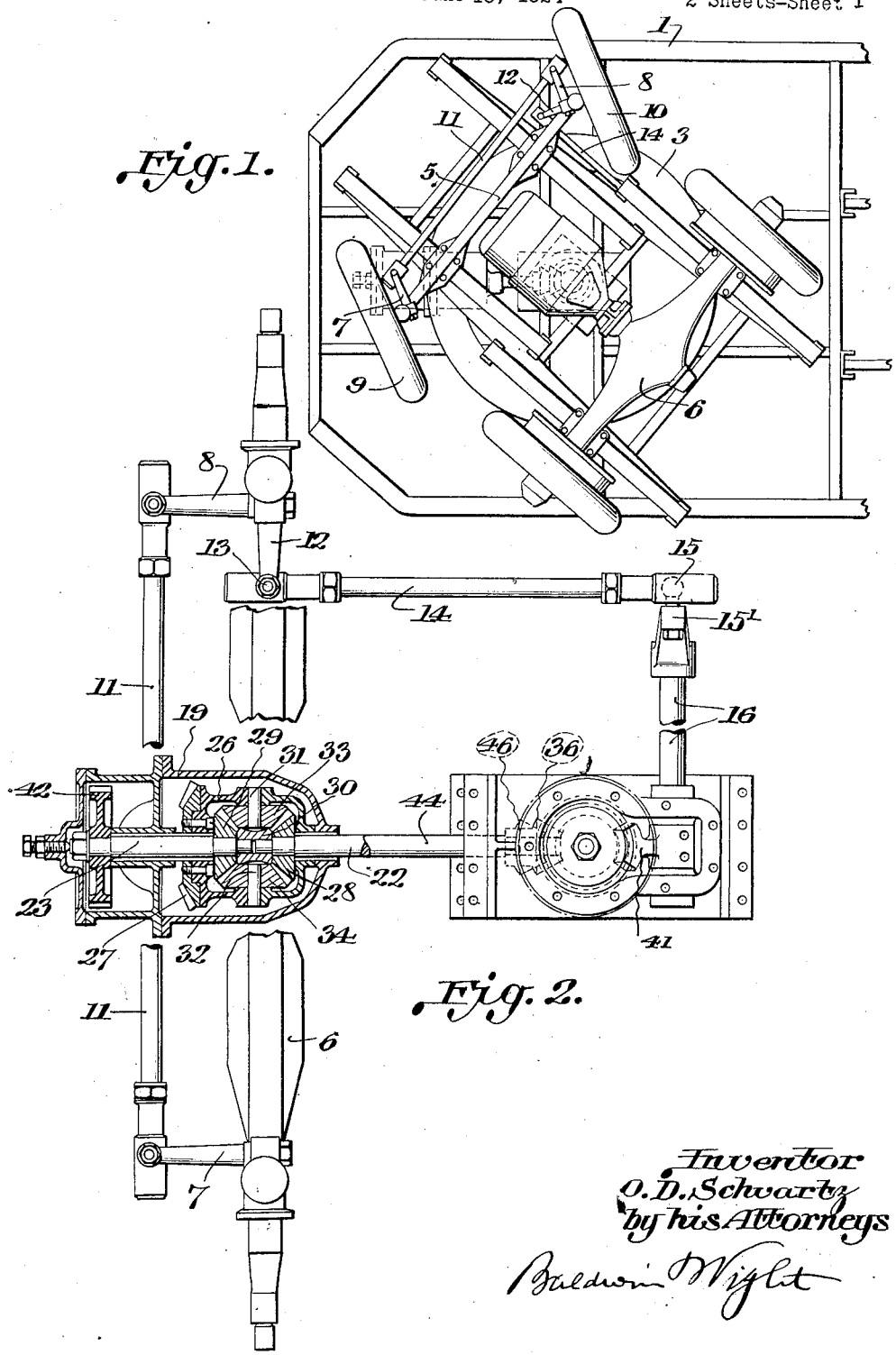
Inventor
O. D. Schvartz
by his Attorneys
Baldwin Wight

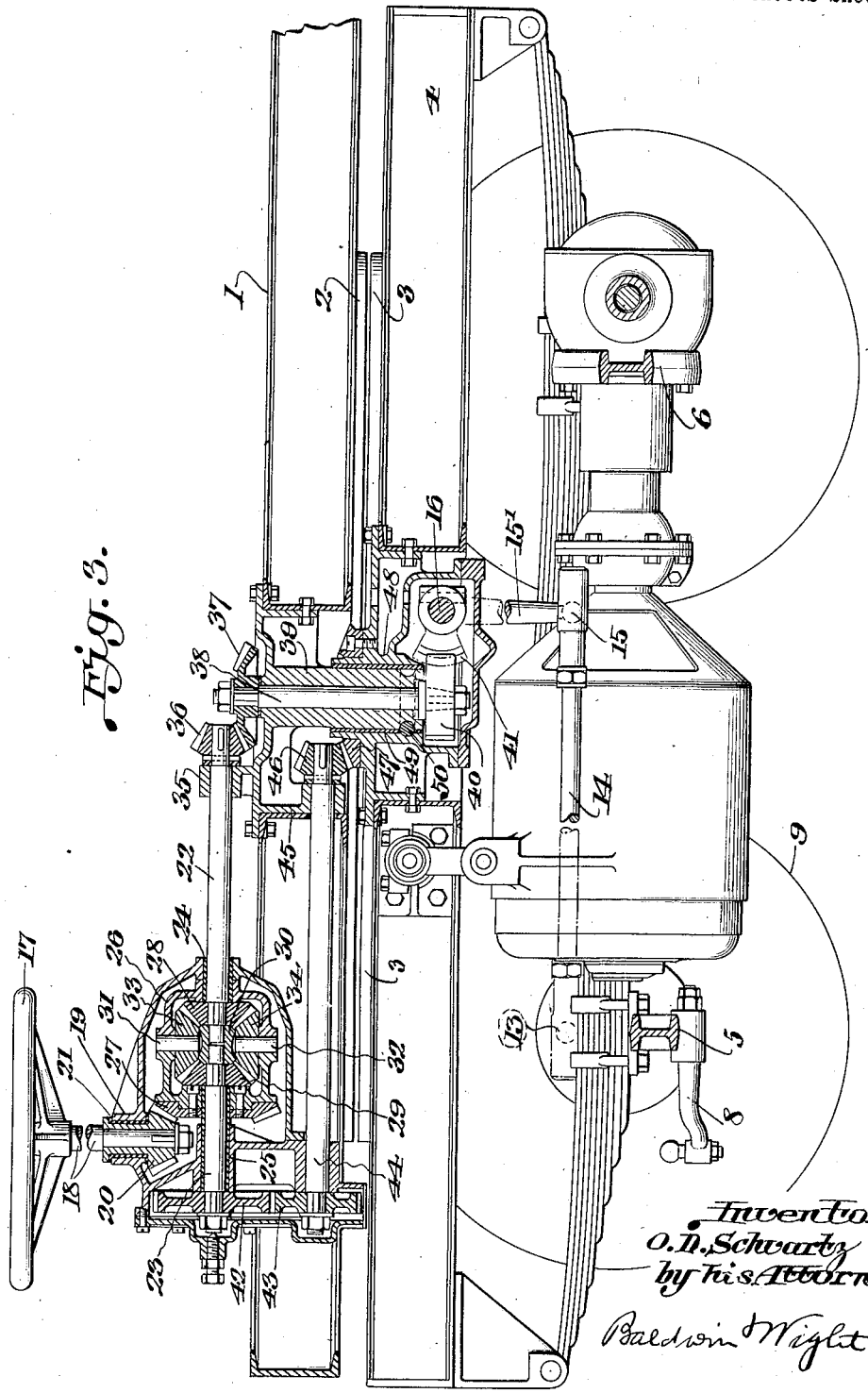

Patented Nov. 15, 1927.

1,648,917

UNITED STATES PATENT OFFICE.

OSCAR DANIEL SCHVARTZ, OF ALBANY, NEW YORK, ASSIGNOR, BY MESNE ASSIGNMENTS, TO VERSARE CORPORATION, A CORPORATION OF NEW YORK.

STEERING DEVICE.

Application filed June 13, 1924. Serial No. 719,819.

The invention is particularly applicable to large busses, trucks, or vehicles such as tractors and trailers which have been difficult to handle in relatively narrow streets or crowded traffic, and is designed to provide a steering mechanism which will facilitate the use of vehicles with long bodies.

The vehicle body is mounted on two truck units of substantially similar character, each having four wheels and a fifth wheel supporting the vehicle body. The front axle of each truck is provided with stub axles carrying the front wheels and the stub axles are connected by the usual tie rod through which turning movement is transmitted to the wheels.

The front wheels of the front truck will be turned through the mechanism described in this application and while the front wheels of the rear truck may also be steered by a similar mechanism they will preferably be turned by mechanism such as described in my Patent No. 1,559,050 granted Oct. 27, 1925, although so far as the present invention is concerned it is immaterial what form of mechanism is employed for turning the front wheels of the rear truck.

An object of the invention is the provision of a differential steering mechanism particularly adapted for such vehicles and which will operate properly notwithstanding the fact that the steering wheel and differential mechanism is carried by the body of the vehicle relative to which the whole truck turns when the vehicle is turning.

Another object is the provision of a steering mechanism in which a train of gearing extends from the steering wheel on the vehicle body to the means for turning the front wheels on the front truck. Also another train of gearing extends from the pivot or king pin of the front truck through the differential gearing in the differential gear casing mounted on the body of the vehicle and thence to the means for turning the front wheels of the front truck. The two trains of gearing have or may have certain elements in common. The first mentioned train of gearing is designed to turn the front wheels of the front truck by means of the manual or other operation of the steering wheel. The second train of gearing is designed and used as a means to automatically retain the relative position of the front wheels of the front truck to the rear wheels of the front truck in the same plane or angle to which they have been or may be turned by the driver of the vehicle regardless of the position of the front truck relative to the body of the vehicle. In other words this latter train of gearing does not rotate or move the steering wheel or interfere with the means for turning the front wheels of the front truck but instead it only compensates or differentiates to maintain the relative position of the front wheels of the front truck to the rear wheels of the front truck during the period of time the front truck is moving to any position relative to the body of the vehicle.

Other objects will be apparent from the following detailed description and the appended claims.

In the drawings:

Figure 1 is a bottom plan view of the front truck and the front portion of the vehicle showing the parts in the position which they assume during a turning movement.

Figure 2 is a bottom plan view with parts in section of the steering connections.

Figure 3 is a longitudinal section through the steering mechanism.

There is illustrated merely the front portion of the body 1 of the vehicle which is supported on the bolster portion 2 of a fifth wheel which turns on the lower portion 3 carried by the front truck 4. This truck has front and rear axles 5 and 6 and the front axle is provided with steering knuckles and stub axles 7 and 8 carrying wheels 9 and 10. The stub axles are connected by the usual tie or connecting rod 11. One stub axle is provided with an inwardly extending or steering arm 12 connected by a ball and socket or other universal joint 13 to a drag link 14 which in turn is connected by a similar joint 15 to an arm or steering lever 15′ on the shaft 16 carried by the truck. Oscillatory movement is given to this shaft by mechanism about to be described.

A steering wheel 17 has a shaft 18 mounted to turn in a casing 19 carried by the vehicle body. To the shaft 18 is splined a bevel pinion 20 having a sleeve fitting within a bushing 21 in said casing. Mounted to turn in appropriate bearings in said casing 19 are two shafts 22 and 23 in axial alignment, said shafts being surrounded by bushings 24 and 25 respectively. A differential casing 26 has bearings on these bushings and at one side has a bevel gear 27 fastened thereto, which gear meshes with the pinion 20 carried by the steering wheel shaft, so that when the steering wheel is turned, the gear 27 and the differential casing also tend to turn.

The inner ends of the shafts 22 and 23 have reduced portions to which are splined or otherwise fastened miter gears 28 and 29 respectively. Beyond these gears the shafts are still further reduced and are stepped in a spider 30. Short stub shafts 31 and 32 a part of the spider are held by the differential casing 26 at right angles to the shafts 22 and 23, and these carry miter gears 33 and 34 respectively, each of which gears is freely movable on its shaft and each of which meshes with both of the gears 28 and 29.

It may be noted from this structure that if power is applied to either of the shafts 22 or 23, the rotation of the driven shaft will be opposite to that of the driving shaft but the differential casing will not be moved. If power is applied to the differential casing, and either shaft is held, the other will be rotated. If both shafts are free to move they will move in the same direction, either at the same speed or either may move faster than the other. This provides a very flexible gearing which will be capable of meeting any emergency that may be encountered.

The outer end of the shaft 22 is supported in a bearing 35 and has a bevel pinion 36 fast thereon, which pinion meshes with a bevel gear 37 fast on a vertical shaft 38 mounted to turn in a sleeve or king pin 39 carried by the body of the vehicle. At the lower end, the shaft 38 carries a worm 40 which meshes with a worm segment 41 on the shaft 16. The turning of the steering wheel therefore operates to turn the front wheels of the vehicle in the usual manner.

The shaft 23 has a gear 42 thereon which meshes with a gear 43 on a shaft 44 mounted at one end in the casing 19 and at the other end in a bearing 45 on the vehicle body. This shaft is provided adjacent the bearing 45 with a bevel pinion 46 adapted to mesh with a bevel gear 47 bolted or otherwise fastened to a truck member or king pin sleeve 48. The sleeve or king pin 39 is mounted to turn in said member 48 having an interposed bushing 49 and a spline 50 which permits relative rotation but prevents longitudinal movement between the sleeve and the member 48.

When the hand or steering wheel is turned to the right, for example, in order to make a right hand turn, the gear 29 and shafts 23 and 44 will at first remain stationary while gears 20, 27, 28, 33 and 34 through the shaft 22, gears 36, 37, shaft 38, and the remainder of the train of connections above described will transmit motion to the connecting rod of the front wheels and turn them toward the right.

If the front wheels of the vehicle have been turned toward the right and power applied so the vehicle has started to move, the body of the front truck, including the lower portion of the fifth wheel, will tend to turn toward the right to bring the rear wheels of the front truck into line with the front wheels. This turning of the fifth wheel and truck toward the right will give the gear 47 a clockwise movement and through the train of mechanism on shafts 44, 23 and 22 will give the gear 37 a corresponding clockwise movement the same number of degrees as turned by gear 47, thus compensating or maintaining the same steering angle of the front wheels. Thus it will be seen this compensating movement is fully automatic during such periods of time as the front truck is moving to any position relative to the body of the vehicle, furthermore that it will function at any time demanded regardless of whether the steering wheel be held stationary or is being turned.

It is to be noted that although the gear 47 and the worm segment 41 are carried by the truck, nevertheless the particular differential gearing employed permits the remainder of the steering mechanism to be carried by the body of the vehicle which has a turning movement relative to said truck, without interfering with the operations of steering and turning as desired. The device has great flexibility and will enable the front truck to be turned in a curve of small radius, while preventing excessive turning of the front wheels relative to the truck or of the whole truck relative to the body of the vehicle.

Various detail changes may be made and parts of the invention employed alone or in connection with other devices without in any manner departing from the spirit of the invention which is to be regarded as limited only by the scope of the appended claims.

I claim as my invention:

1. In a vehicle, a body, a front truck to which the body is pivoted, said truck having front and rear sets of wheels, a steering wheel, a train of connections for turning the front wheels of said truck from the steering wheel, and means including a second train of connections operatively connected to the truck and to the front wheels and actuated by the turning of the front truck relative to the body for automatically maintaining the same relation between the front wheels and the truck when the truck turns relative to the body of the vehicle.

2. In a vehicle, a body, a front truck having front and rear wheels, said truck being freely movable relative to the body of the vehicle, a steering wheel, a train of connections for turning the front wheels of said truck from the steering wheel, a gear fast to the truck to rotate therewith about the axis of turning movement of the truck relative to the vehicle body, and a train of connections from said gear to compensate said first train of connections for the turning of the truck relative to the body of the vehicle.

3. In a vehicle, a body, a front truck having front and rear wheels, a fifth wheel about the axis of which the truck is freely movable relative to the body of the vehicle, a steering wheel, a train of connections for turning the front wheels of said truck from the steering wheel, a gear on said truck and rotating about the axis about which the relative turning movement between the truck and vehicle body takes place, and a train of connections operated by said gear and including differential gearing for automatically maintaining the front wheels of the truck in their angular relation to the rear wheels during the turning of the truck relative to the vehicle body.

4. In a vehicle, a body, a front truck having front and rear wheels, said truck being freely movable relative to the body of the vehicle, a steering wheel, a differential gear casing moved by the steering wheel, connections from said casing to the front wheels of the truck for turning them from the steering wheel, a gear on the truck body which turns therewith about the axis of turning movement between the truck and vehicle body, and a train of connections from said gear to the differential gearing in said casing which automatically compensates for the turning movement of the truck relative to the vehicle body.

5. In a vehicle, a body, a front truck having front and rear wheels, said truck being freely movable relative to the body of the vehicle, a steering wheel, a differential gear casing moved by the steering wheel, two alined shafts having their opposed ends within said casing, means whereby the turning of one shaft turns the front wheels of the vehicle, means for turning the second shaft when the truck turns relative to the vehicle, and means whereby the turning of the second shaft tends to turn the first and thus compensates for the turning movement of the truck relative to the vehicle body.

In testimony whereof, I have hereunto subscribed my name.

OSCAR DANIEL SCHVARTZ.